Nov. 5, 1929.  J. H. HERMAN  1,734,807
FISHING TOOL
Filed Oct. 2, 1925
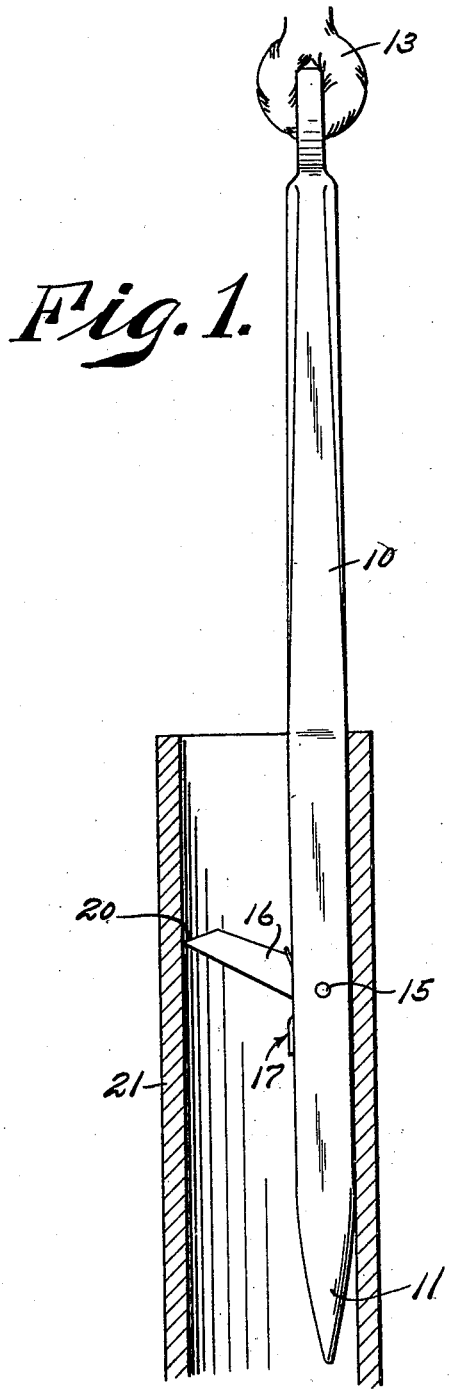
Fig. 1.
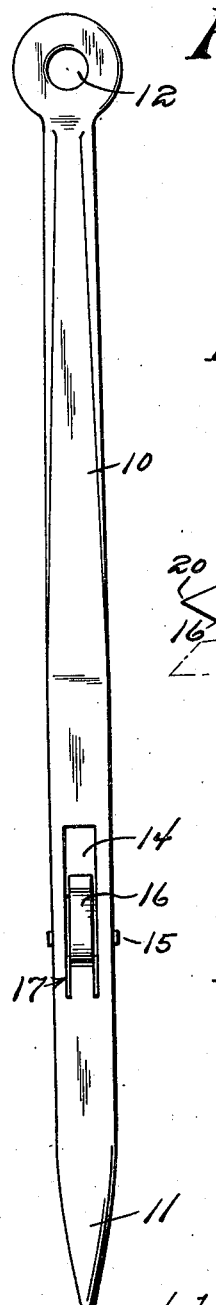
Fig. 2.
Fig. 3.
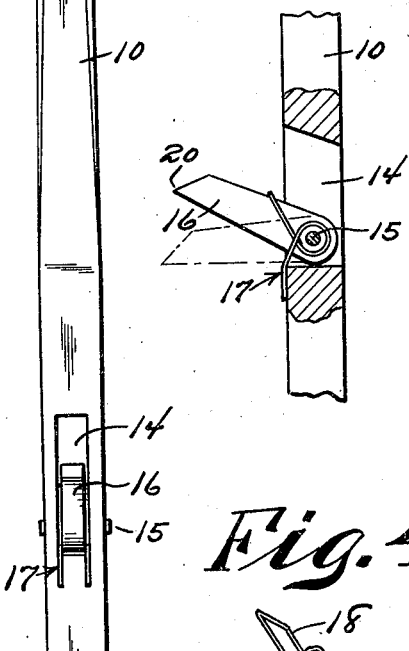
Fig. 4.
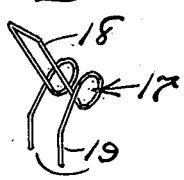
John H. Herman
INVENTOR
BY Victor J. Evans
ATTORNEY
WITNESS:

Patented Nov. 5, 1929

1,734,807

UNITED STATES PATENT OFFICE

JOHN H. HERMAN, OF NEW CASTLE, PENNSYLVANIA

FISHING TOOL

Application filed October 2, 1925. Serial No. 60,075.

This invention relates to improvements in fishing tools especially designed for the recovery of lost pipe sections from wells, an object being to provide a tool which may be readily engaged with the lost pipe section whether or not the said section is visible from the top of the well.

Another object of the invention is the provision of a fishing tool for the above purpose which is simple and durable in construction, efficient and reliable in use and which may be arranged to engage pipe sections of different diameters.

With the above and other objects in view, the invention further includes the following novel features and details of construction, to be hereinafter more fully described, illustrated in the accompanying drawings and pointed out in the appended claims.

In the drawings:—

Figure 1 is an elevation illustrating the use of the invention, a fragmentary portion of a pipe section being shown in section.

Figure 2 is an elevation of the tool at right angles to Figure 1.

Figure 3 is a fragmentary elevation partly in section illustrating the means of mounting the dog.

Figure 4 is a detail perspective view of the dog spring.

Referring to the drawings in detail wherein like characters of reference denote corresponding parts, the reference character 10 indicates the shank of the tool which is provided with a pointed end 11 and with an eye 12, the latter being designed to provide means for attachment to a rope or cable 13.

The tool is provided adjacent the pointed end 11 with an opening 14 and mounted upon a pivot 15 which extends transversely across the opening near one end thereof, is a dog 16. A spring 17 has one end formed to provide a loop 18 for engagement over the dog 16, the side portions of the loop being wrapped around the pivot 15 upon opposite sides of the dog, while the free ends 19 of the spring are arranged to engage the face of the tool adjacent the opening 14 so as to yieldingly urge the dog in a direction toward the end of the opening as shown by the dotted lines in Figure 3. The outer end of the dog is beveled to provide a gripping edge 20.

In the event of the loss of a pipe section within a well, the tool is lowered and should the lost pipe section be visible, the pointed end 11 of the tool may be readily inserted within the upper end of the pipe section. Should the dog 16 engage the upper end of the pipe section, it will be yieldingly forced inward so that the tool may enter the said section with the edge 20 engaging the inner wall of the pipe. When the tool is moved upward, the edge 20 will impinge or bite into the pipe 21 as shown in Figure 1 of the drawings, so that the latter may be readily withdrawn. After the pipe has been removed from the well the tool may be readily disengaged therefrom.

Should the lost pipe section be submerged and therefore not visible from the top of the well, the cable 13 may by measurement have its length regulated in accordance with the depth of the lost pipe section 21 so that by moving the tool vertically at the proper depth the pointed end 11 may enter the pipe section.

It is preferred to make the pivot 15 removable, so that dogs of different lengths may be used to adapt the tool for use with pipes of different diameters.

The invention is susceptible of various changes in its form, proportions and minor details of construction and the right is herein reserved to make such changes as properly fall within the scope of the appended claim.

Having described the invention what is claimed is:—

A fishing tool comprising a narrow elongated shank having an eyelet at the upper end thereof for attachment to a cable and having its lower end tapered to a point, a slot extending thru said shank adjacent its bottom end, the upper edge of the slot being beveled, a dog pivotally mounted in the slot on a transverse pin, the upper edge of the dog being beveled whereby said dog may be withdrawn to lie substantially in the plane of the shank, a spring formed of a single piece of wire doubled upon itself and having its free ends adapted to bear against the shank, and having its medial portions surrounding said pivot and having a portion of the same straddling said dog and adapted to bear against the same to press the same outwardly, said dog and spring being removable.

In testimony whereof I affix my signature.

JOHN H. HERMAN.